(12) United States Patent
Godfrey et al.

(10) Patent No.: US 11,651,185 B2
(45) Date of Patent: May 16, 2023

(54) SYSTEM AND METHOD FOR PROMINENTLY PROPAGATING ADVERTISEMENTS AND MESSAGES FROM A GARMENT

(71) Applicants: Jacob Godfrey, Cheektowaga, NY (US); Christa Platts, Cheektowaga, NY (US)

(72) Inventors: Jacob Godfrey, Cheektowaga, NY (US); Christa Platts, Cheektowaga, NY (US)

(73) Assignee: TAG TAPPERS, LLC, Cheektowaga, NY (US)

( * ) Notice: Subject to any disclaimer, the term of this patent is extended or adjusted under 35 U.S.C. 154(b) by 0 days.

(21) Appl. No.: 17/745,664

(22) Filed: May 16, 2022

(65) Prior Publication Data
US 2022/0366206 A1    Nov. 17, 2022

Related U.S. Application Data

(60) Provisional application No. 63/188,906, filed on May 14, 2021.

(51) Int. Cl.
| | |
|---|---|
| *G06K 19/077* | (2006.01) |
| *H04B 5/00* | (2006.01) |
| *G06K 19/07* | (2006.01) |
| *A41D 1/00* | (2018.01) |

(52) U.S. Cl.
CPC ....... *G06K 19/07758* (2013.01); *A41D 1/002* (2013.01); *G06K 19/0723* (2013.01); *H04B 5/0062* (2013.01)

(58) Field of Classification Search
CPC ............... A41D 1/002; G06K 19/0723; G06K 19/07758; G06K 19/07762; G09F 2003/0282; G09F 21/023; G09F 3/0297; H04B 5/0062
See application file for complete search history.

(56) References Cited

U.S. PATENT DOCUMENTS

| | | | |
|---|---|---|---|
| 6,711,414 B1 | 3/2004 | Stacavich-Notaro | |
| 7,119,659 B2 | 10/2006 | Bonalle et al. | |
| 8,660,897 B2 | 2/2014 | Abhyanker | |
| 2006/0180647 A1* | 8/2006 | Hansen | G07F 17/20 235/375 |
| 2010/0321161 A1* | 12/2010 | Isabell | D06H 1/04 340/10.1 |

(Continued)

*Primary Examiner* — Omer S Khan
(74) *Attorney, Agent, or Firm* — Vincent G. Lotempio

(57) ABSTRACT

A system and method for prominently propagating advertisements and messages from a garment. The system and method provide a washable fabric section that contains a waterproof Near Field Communication (NFC) tag, and a logo label. The NFC tag and the logo label are disposed adjacent to each other, and separated by a fold line for easy visible delineation. The washable fabric section is integrated, possibly through sewing, into the washable fabric section. The washable fabric section, with the NFC tag and the logo is disposed at a prominently visible location on the garment, so as to enable widespread distribution of the advertisement or message through NFC technology. An NFC reader scans the NFC tag to read the data contained therein, which may include a web site, a social media platform, advertisements, and messages.

11 Claims, 10 Drawing Sheets

1. Right Sleeve
2. Inside Neck
3. Left Sleeve
4. Left Hem
5. Right Hem
6. Outside Neck

(56) References Cited

U.S. PATENT DOCUMENTS

| | | | | |
|---|---|---|---|---|
| 2012/0166241 A1* | 6/2012 | Livingston | ......... | G06Q 10/0631 |
| | | | | 707/E17.014 |
| 2017/0132892 A1* | 5/2017 | Vargas | ................... | G06K 17/00 |
| 2021/0020012 A1* | 1/2021 | Shakedd | ............ | G06K 19/0708 |
| 2022/0117558 A1* | 4/2022 | Nicolae | ................ | A61B 5/6805 |

* cited by examiner

@716Mafia

@716Mafia

716Mafia Store http://716Mafia.com

CLAIM

JOIN TAG TAPPERS COMMUNITY >

1. Right Sleeve
2. Inside Neck
3. Left Sleeve
4. Left Hem
5. Right Hem
6. Outside Neck neck label stitch details     exterior label stitch details

SYSTEM AND METHOD FOR PROMINENTLY PROPAGATING ADVERTISEMENTS AND MESSAGES FROM A GARMENT

RELATED APPLICATION

This application claims priority under 35 U.S.C. 119 of the U.S. Patent Application Ser. No. 63/188,906 filed on May 14, 2021, which is hereby incorporated by reference in its entirety.

FIELD OF THE INVENTION

The present invention relates generally to a System and Method for Prominently Propagating Advertisements and Messages from a Garment. More so, the system and method provide a waterproof Near Field Communication (NFC) label, and a logo, that integrate into a washable fabric section of a garment, at a prominently visible location, so as to enable widespread distribution of the advertisement or message through NFC technology.

BACKGROUND OF INVENTION

In conventional garments, there is no integration of any kind of NFC chips for sharing information association with the garments or information associated with the manufacturer of the garment. Currently, when a user wishes to buy a product such as a garment then the user visits a manufacturer store and purchase the same from the store. However, if a user likes a garment that is worn by another user then the user has no medium to identify the brand of the garment and further cannot identify if the user wearing the garment is willing to resell the garment for a smaller price.

Additionally, even if the user wearing the garment has extra such pieces of the worn garment and is willing to resell the same then in such scenarios, the original manufacturer does not benefit from such a resale transaction. In view of this, the original manufacturer is deprived of the fees that it can potentially receive in a reseller market.

SUMMARY

According to embodiments illustrated herein, there may be provided a system for prominently propagating advertisements and messages from a garment, the system comprising: a washable fabric section defining an outer side and an inner side, the washable fabric section being attachable to a garment, whereby the inner side faces the garment, the washable fabric section further defining a fold line along the longitudinal, whereby the fold line separates the washable fabric section into a first portion and a second portion, whereby the washable fabric section attaches to a prominently visible area of the garment. In an embodiment, an NFC tag integrated into the first portion of the washable fabric, the NFC tag comprising an antenna and an integrated circuit chip for storing data, the integrated circuit chip enabling wireless communication with a communication device. In an embodiment, the NFC tag transmits information through NFC technology. In an embodiment, the information comprises at least one of an online link to an advertisement, a message, a link for buying a product, or a link for joining a social media network. In an embodiment, a logo label integrated into the second portion of the washable fabric, the logo label comprising indicia, a graphic mark, an emblem, a symbol, or a stylized name used to identify a company, an organization, a product, or a brand.

According to embodiments illustrated herein, there may be provided a method for prominently propagating advertisements and messages from a garment, the method comprising providing a garment. The method further comprises providing a washable fabric section. The method further comprises integrating an NFC tag into the washable fabric, the NFC tag comprising data. The method further comprises integrating a logo label into the washable fabric, the logo label being pertinent to the data, whereby the logo label and the NFC tag are separated by a fold line. The method further comprises attaching the washable fabric section to a prominent position on the garment. The method further comprises scanning the NFC tag with an NFC reader. The method further comprises accessing an online website or social media platform pertinent to the data.

According to embodiments illustrated herein, there may be provided a system for providing one or more items to users, the system comprising a processor. The system may further comprise a NFC tag coupled with the processor to control the functioning of the NFC tag, wherein the NFC tag comprises an antenna and an integrated circuit chip for storing data, the integrated circuit chip enabling wireless communication with a communication device. The system may further comprise a sewing accessory for attaching the NFC tag to a washable fabric and the washable fabric is further sewed to a garment. The system may further comprise a memory communicatively coupled to the processor, wherein the memory stores processor instructions, which, on execution, causes the processor to scan the NFC tag using a NFC reader. The system may further receive a user profile information on the communication device based on the scanning. The system may further provide one or more items available for at least one of sale or resale from at least one of the user or a manufacturer to another user who has scanned the NFC tag. The system may further perform one or more actions on the one or more items available for at least one of sale or resale, wherein the one or more actions comprise buying the one or more items, or reselling the one or more items, wherein if the one or more items are resold to another user then a pre-defined amount of a transaction value is transmitted to an original manufacturer of the one or more items.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
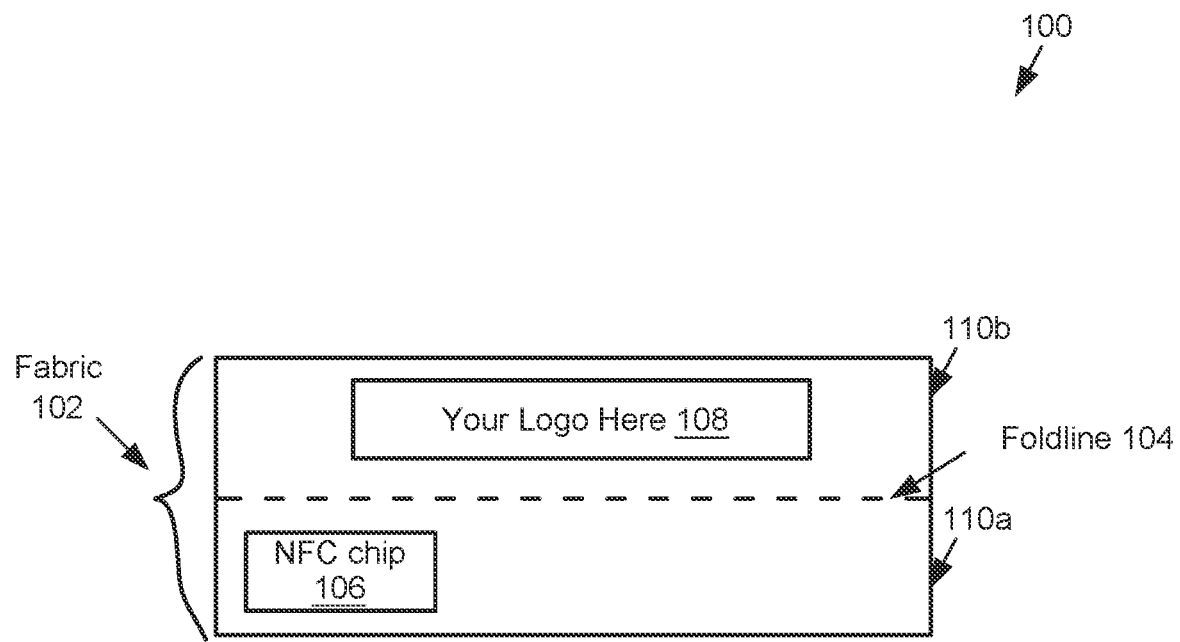
FIG. 1 illustrates a top view of an exemplary system comprising a washable fabric section, an integrated NFC tag, and a logo label for prominently propagating advertisements and messages from a garment, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

Figure 2:
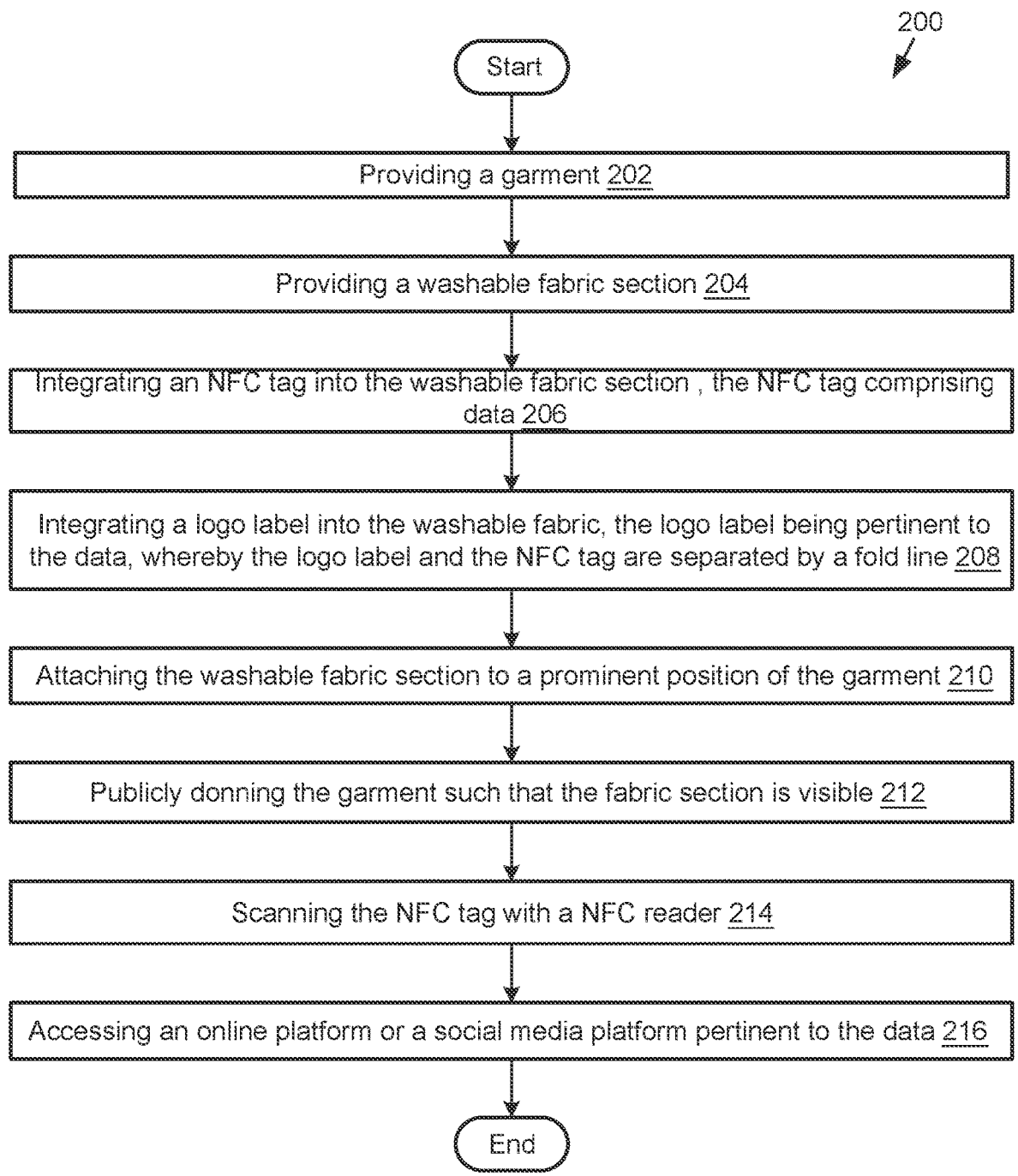
FIG. 2 illustrates a flowchart of an exemplary method for prominently propagating advertisements and messages from a garment, in accordance with an embodiment of the present invention.

In one embodiment of the present invention presented in FIGS. 1-2, a system 100 and method 300 for prominently propagating advertisements and messages from a garment. The system 100 and method provide a washable fabric section 102 that contains a waterproof Near Field Communication (NFC) tag 106, and a logo label 108. NFC tag 106 and logo label 108 are disposed adjacent to each other, and separated by a fold line 104 for easy visible delineation. The washable fabric section 102 is integrated, possibly through sewing, into a washable fabric section 102. Washable fabric section 102, with NFC tag 106 and logo label 108 is disposed at a prominently visible location on the garment, so as to enable widespread distribution of the advertisement or message through NFC technology. An NFC reader scans NFC tag 106 to read the data contained therein, which may include a web site, a social media platform, advertisements, and messages.

In one aspect of the present invention, a system 100 for prominently propagating advertisements and messages from a garment, comprises a washable fabric section 102 defining an outer side and an inner side, the washable fabric section 102 being attachable to a garment, whereby the inner side faces the garment, the washable fabric section 102 further defining a fold line 104 along the longitudinal, whereby the fold line 104 separates the washable fabric section 102 into a first portion and a second portion. In an embodiment, the washable fabric section 102 attaches to a prominently visible area of the garment. In an embodiment, an NFC tag 106 integrated into the first portion 110a of the washable fabric, the NFC tag 106 comprising an antenna and an integrated circuit chip for storing data, the integrated circuit chip enabling wireless communication with a communication device. In an embodiment, the NFC tag 106 distributes an online link to an advertisement or a message through NFC technology. In an embodiment, a logo label 108 integrated into the second portion 110b of the washable fabric, the logo label 108 comprising indicia, a graphic mark, an emblem, a symbol, or a stylized name used to identify a company, an organization, a product, or a brand.

In a second aspect, the system 100 further comprises an NFC reader operable to energize the integrated circuit chip to transfer the data, the NFC reader further operable to display the data.

In another aspect, the NFC reader comprises a smart phone.

In another aspect, the NFC tag 106 is waterproof.

In another aspect, the washable fabric section 102 is sewn into the garment.

In another aspect, the washable fabric section 102 defines a flat, rectangular shape.

In another aspect, the data stored in the integrated circuit chip comprises a social media site for the company, the organization, the product, or the brand.

In another aspect, the data stored in the integrated circuit chip comprises a website for the company, the organization, the product, or the brand.

In another aspect, the garment is a shirt.

One objective of the present invention is to allow a company to prominently display and share social media platforms and websites with the public.

Another objective is to attach the washable fabric section 102 with the NFC tag 106 and the logo label 108 to a wide variety of garments.

Yet another objective is to provide built in security features into the NFC tag 106.

An exemplary objective is to provide an inexpensive to manufacture system 100 for prominently propagating advertisements and messages in a garment.

As referenced in FIG. 1, system 100 comprises a washable fabric section 102. The fabric section 102 can include a flat, rectangular, and flexible piece of fabric that is sized to affix to a garment, and in one embodiment, to the chest area of a shirt. Garment may include, without limitation, a shirt, a pair of pants, a dress, a gown, and a skirt. Washable fabric section 102 defines an outer side and an inner side, with the inner side facing the garment. The washable fabric section 102 is attachable to a garment through sewing, welding, or other fabric attachment means known in the art. Washable fabric section 102 attaches to a prominently visible area of the garment, with the outer side facing out. In one embodiment, fabric section 102 has a width of 4" and a length of 2".

In some embodiments, washable fabric section 102 further includes a fold line 104 that extends along the longitudinal. As shown in FIG. 1, the fold line 104 separates the washable fabric section 102 into a first portion 110a and a second portion 110b. However, in alternative embodiments, different orientations and numbers of fold line 104 may also be used. Suitable materials for the washable fabric section 102 may include, without limitation, cotton, polyester, wool, polymer, and a nonwoven material.

Turning now to FIG. 2, system 100 includes an NFC tag 106 that is integrated into first portion 110a of the washable fabric. NFC tag 106 may be waterproof, similar to fabric section 102. NFC tag 106 enables NFC technology to be introduced into the washable fabric section 102. Specifically, NFC tag 106 distributes an online link to an advertisement or a message through NFC technology. In some embodiments, the NFC tag 106 comprises an antenna and an integrated circuit chip for storing data. In one non-limiting embodiment, the data stored in the integrated circuit chip comprises a social media site for the company, the organization, the product, or the brand. In this manner, a user can access the data directly from the garment.

The integrated circuit chip enables wireless communication with a communication device, such as an NFC reader. NFC reader is operable to read information stored in the circuit module by transmitting electromagnetic power and command signals to NFC tag 106. The antenna of the NFC tag 106, upon receiving the signals, would power up the chip and retrieve the data from the circuit and transmit it back to the NFC reader.

System 100 may also include an NFC reader for communication with the NFC tag 106. The NFC reader is operable to energize the integrated circuit chip to transfer the data, the NFC reader further operable to display the data. Those skilled in the art will recognize that Near Field Communication technologies have an operation range of a few centimeters. This means that the NFC tag 106 and the NFC reader has a place to enable the communication signals to be communicated therebetween.

Adjacent, and opposite of the NFC tag 106, is a logo label 108. Logo label 108 integrates into second portion 110b of the washable fabric section. The fold line 104 serves to separate logo label 108 from NFC tag 106. In some embodiments, logo label 108 may include, without limitation, indicia, a graphic mark, an emblem, a symbol, or a stylized name used to identify a company, an organization, a product, or a brand. Logo label 108 is related to data on NFC tag 106, and may include similar information. In this manner, a user can easily view logo label 108 with a cursory glance, and then receive a more in-depth review of the data by scanning the NFC tag 106.

In an embodiment, a system for providing one or more items to users is disclosed. The system 100 may comprise a processor, a NFC tag, a sewing accessory, and a memory communicatively coupled to the processor.

The processor comprises suitable logic, circuitry, interfaces, and/or code that may be configured to execute a set of instructions stored in the memory. The processor may be implemented based on several processor technologies known in the art. The processor works in coordination with a transceiver, such as a NFC tag. Examples of the processor include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory comprises suitable logic, circuitry, interfaces, and/or code that may be configured to store the set of instructions, which are executed by the processor. In an embodiment, the memory may be configured to store one or more programs, routines, or scripts that are executed in coordination with the processor 202. The memory may be implemented based on a Random Access Memory (RAM), a Read-Only Memory (ROM), a Hard Disk Drive (HDD), a storage server, and/or a Secure Digital (SD) card.

The transceiver, such as the NFC tag comprises of suitable logic, circuitry, interfaces, and/or code that may be configured to receive and transmit information stored on the memory and the NFC tag, via the near field communication network.

In an embodiment, the NFC tag may be coupled with the processor to control the functioning of the NFC tag. In an embodiment, the NFC tag may comprise an antenna and an integrated circuit chip for storing data, and the integrated circuit chip enables wireless communication with a communication device, such as a mobile device. In an embodiment, the NFC tag comprises information comprises at least one of an online link to an advertisement, a message, a link for buying a product, or a link for joining a social media network.

In an embodiment, a sewing accessory, such as a button may be utilized for attaching the NFC tag to a washable fabric and the washable fabric is further sewed to a garment, such as a T-shirt. In an embodiment, the sewing accessory is a button.

The memory communicatively coupled to the processor stores processor instructions, which, on execution, causes the processor to scan the NFC tag using a NFC reader. After the NFC tag is scanned then the information stored in the NFC tag may be received by a communication device and user profile information may also be received on the communication device using which the NFC tag is scanned. In an embodiment, the NFC reader is integrated with the communication device to retrieve the user profile information. In an embodiment, the communication device is a mobile device.

In response to the scanning, one or more items available for at least one of sale or resale from at least one of the user or a manufacturer may be provided to another user who has scanned the NFC tag.

Once one or more items are provided to the user, then one or more actions on the one or more items available for at least one of sale or resale may be performed by the user who scanned the NFC tag. In an embodiment, the one or more actions may comprise buying the one or more items, or reselling the one or more items. In an embodiment, if the one or more items are resold to another user then a pre-defined amount of a transaction value is transmitted to an original manufacturer of the one or more items. For example, if on a T-shirt that is worn by User A the NFC tag is sewed on a left sleeve then a User B may come and scan the NFC tag on the left sleeve by bringing the mobile device of the User B near the left sleeve of the User A.

After the scanning the User B may be able to view the profile of User A and one or more items that the User A is willing to sell or resale. In an embodiment, User A may have plurality of packed pieces of the T-shirt that the User A may want to resale and the T-shirt may be of manufacturer ABC. Also, there may be a list of items that the User B may directly want to purchase from the original manufacturer. In an exemplary implementation, the User B may decide to purchase the T-shirt that the User A has made available for resale. The User B may make the necessary payment, such as USD 10 to the User A for the T-shirt and in response to such a transaction USD 2 may be credited to the original manufacturer. Thus, the original manufacturer earns out of a resale transaction which was not possible earlier.

In an embodiment, the one or more actions comprise sharing the one or more items available for sale or resale on a social media network. For example, after buying of the product the User B may advertise on his profile that the recently bought T-shirt is again available for resale for a predefined price.

In an embodiment, providing the one or more items comprising displaying the one or more items to the user for buying; and after a confirmed buying by the user, shipping the one or more items to an address of the user.

FIG. 3 references a flowchart of an exemplary method 300 for prominently propagating advertisements and messages from a garment. Method 300 may include an initial Step 302 of providing a garment. Garment may include, without limitation, a shirt, a pair of pants, a dress, a gown, and a skirt. Method 300 may further comprise a Step 304 of providing a washable fabric section. A Step 306 includes integrating an NFC tag into the washable fabric, the NFC tag comprising data. In some embodiments, a Step 308 comprises integrating a logo label into the washable fabric, the logo label being pertinent to the data, whereby the logo label and the NFC tag are separated by a fold line. For example, a company name can have a picture of the company mascot and a stylistic illustration of the company name.

A Step 310 includes attaching the washable fabric section to a prominent position on the garment. This can include on the chest region of a shirt, for example. Another Step 312 may include publicly donning the garment, such that the fabric section is visible. In some embodiments, a Step 314 may include scanning the NFC tag with an NFC reader. NFC reader can be a smart phone with an NFC scanning app. A Step 316 comprises accessing an online website or social media platform pertinent to the data. However, in other embodiments, a database or other data source may be stored on the NFC chip.

Figure 3A:
FIG. 3A illustrates a washable fabric that may be coupled with a NFC tag, in accordance with an embodiment of the present invention.
Figure 3B:
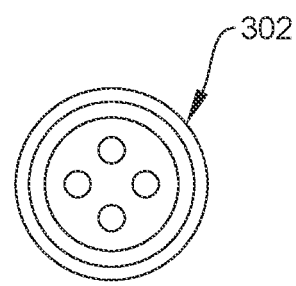
FIG. 3B illustrates a sewing accessory for attaching the washable fabric coupled with the NFC tag to the garment, in accordance with an embodiment of the present invention.

FIG. 3A illustrates a washable fabric that may be coupled with a NFC tag, in accordance with an embodiment of the present invention. In an embodiment, the washable fabric may include an outer side 300 and an inner side 304. The washable fabric is attached to the garment using a sewing accessory 302 as shown in FIG. 3B. FIG. 3B illustrates a sewing accessory for attaching the washable fabric coupled with the NFC tag to the garment, in accordance with an embodiment of the present invention. As illustrated in FIG. 3B, the sewing accessory 302 may be a button that may be utilized to sew the washable fabric to the garment, such as a T-Shirt.

Figure 3C:
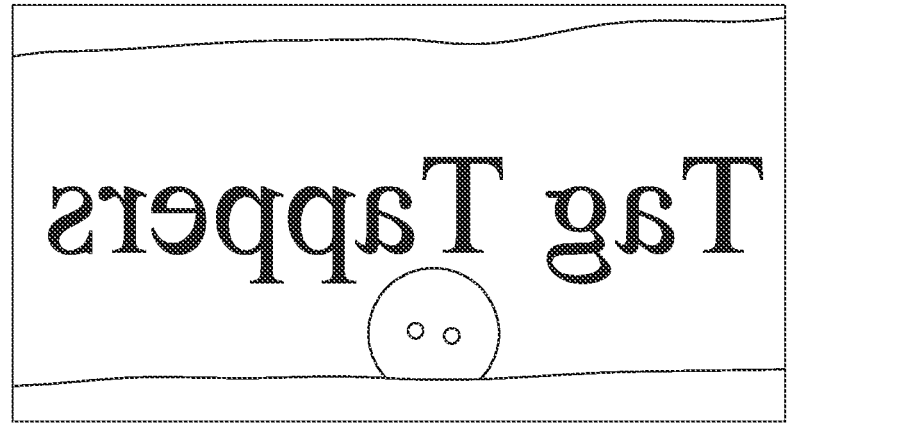
FIG. 3C illustrates a back view of the washable fabric that may be coupled with a NFC tag and further illustrates how the sewing accessory is coupled to the washable fabric for attaching the washable fabric to the garment, in accordance with an embodiment of the present invention.
Figure 4:
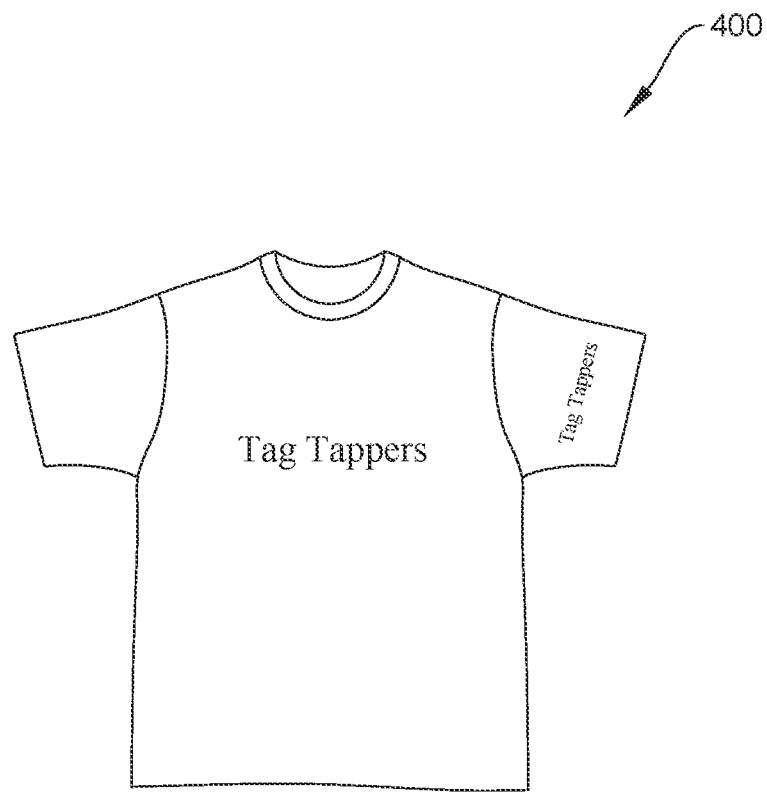
FIG. 4 illustrates a garment that is attached with the washable fabric coupled with the NFC chip using the sewing accessory, in accordance with an embodiment of the present invention.

The sewing accessory, such as a button 302 is sewed to the inner side of the washable fabric which in turn is again sewed to the garment. In an embodiment, the inner side 304 of the washable fabric faces the garment. In an embodiment, the washable fabric section further defines a fold line along the longitude and the fold line separates the washable fabric section into a first portion and a second portion. In an embodiment, the washable fabric section attaches to a prominently visible area of the garment, such as the center part of the T-shirt in the front side of the T-shirt. FIG. 3C illustrates a back view 304 of the washable fabric that may be coupled with a NFC tag and further illustrates how the sewing accessory, such as a button is coupled to the washable fabric for attaching the washable fabric to the garment, in accordance with an embodiment of the present invention;

FIG. 4 illustrates a garment 400, such as a T-shirt that is attached with the washable fabric coupled with the NFC chip using the sewing accessory, in accordance with an embodiment of the present invention. For example, the washable fabric coupled with the NFC chip is attached to a left sleeve of the T-shirt. In an embodiment, a user may scan the NFC tag coupled to the washable fabric using a NFC reader, such as a mobile device to retrieve information stored in the NFC tag.

Figure 5:
FIG. 5 illustrates a profile of a user on a social media network, in accordance with an embodiment of the present invention.

FIG. 5 illustrates a profile of a user on a social media network, in accordance with an embodiment of the present invention. Specifically, the FIG. 5 illustrates a graphical user interface 500 that is displayed to a user when the profile of the user is created in the social network. In an embodiment, the name of the social network may be Tag Tappers. The user may visit the Tag Tappers social network and authenticate himself/herself and then further create a profile. In an embodiment, a photo of the user may also be displayed in the profile. In an embodiment, the user may customize the profile and may add a plurality of links associated with profile and a plurality of items that the user may wish to sell. In an embodiment, whenever another user scans the NFC tag associated with a garment of the user and the profile of the user, then all the relevant links of the items that are available for sale via the user may be provided to the another user.

In an embodiment, once a profile is created by a user then the user can go and claim/buy one or more items from another person on the social media network and the one or more items may be shipped to the shipping address of the user as mentioned in the profile of the user. Further, the user can track and identify the status of the order of the one or more items that the user has requested for. In an embodiment, the user may also order from the manufacturer rather than buying the items from another user. In an embodiment, after the user receives the one or more items from one of another user or the manufacturer then the user may enter the product in the online marketplace and make it available for resale at a price that the user wants to sell. In an embodiment, if the sale is approved on the market place i.e. another buyer is interested to buy the item then a small fee and a percentage of the transaction fee will go back to the original creator and seller of the product. Thus, using this mechanism the original manufacturer will always benefit from multiple resell of the one or more items even if the item is being purchased by and being transferred between multiple owners. This allows the manufacturer to enter a 36 billion dollar market and further give the customer a new quicker, faster and easier way to brand themselves and further share content and connect a plurality of users via the social media network who are using the one or more items. Thus, the manufacturer has a chance to enter the reseller market and make profits via multiple resale of the one or more items.

Figure 6:
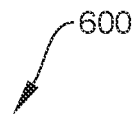
FIG. 6 illustrates a graphical user interface displayed to a user of the social media network for buying/claiming an item from another person on the social media network, in accordance with an embodiment of the present invention.
Figure 6:
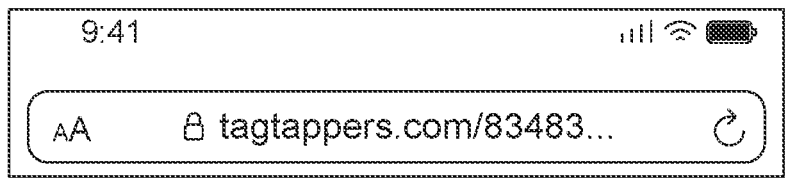
Figure 6:
Figure 6:
Figure 6:
Figure 6:
Figure 6:
Figure 6:

FIG. 6 illustrates a graphical user interface 600 displayed to a user of the social media network for buying/claiming an item from another person on the social media network, in accordance with an embodiment of the present invention. The graphical user interface 600 may display a plurality of links associated with a plurality of items that may be purchased by the user who scans the NFC tag. In order to facilitate the buying experience, a claim button (user interface) is displayed to the user. In an embodiment, a user can purchase resale items from another user or may consider buying the item directly from the manufacturer.

Figure 7:
FIG. 7 illustrates a use case scenario wherein a user scans the washable fabric that is coupled with the NFC tag using a NFC reader so that the information within the NFC tag can be displayed to the user, in accordance with an embodiment of the present invention.
Figure 8:
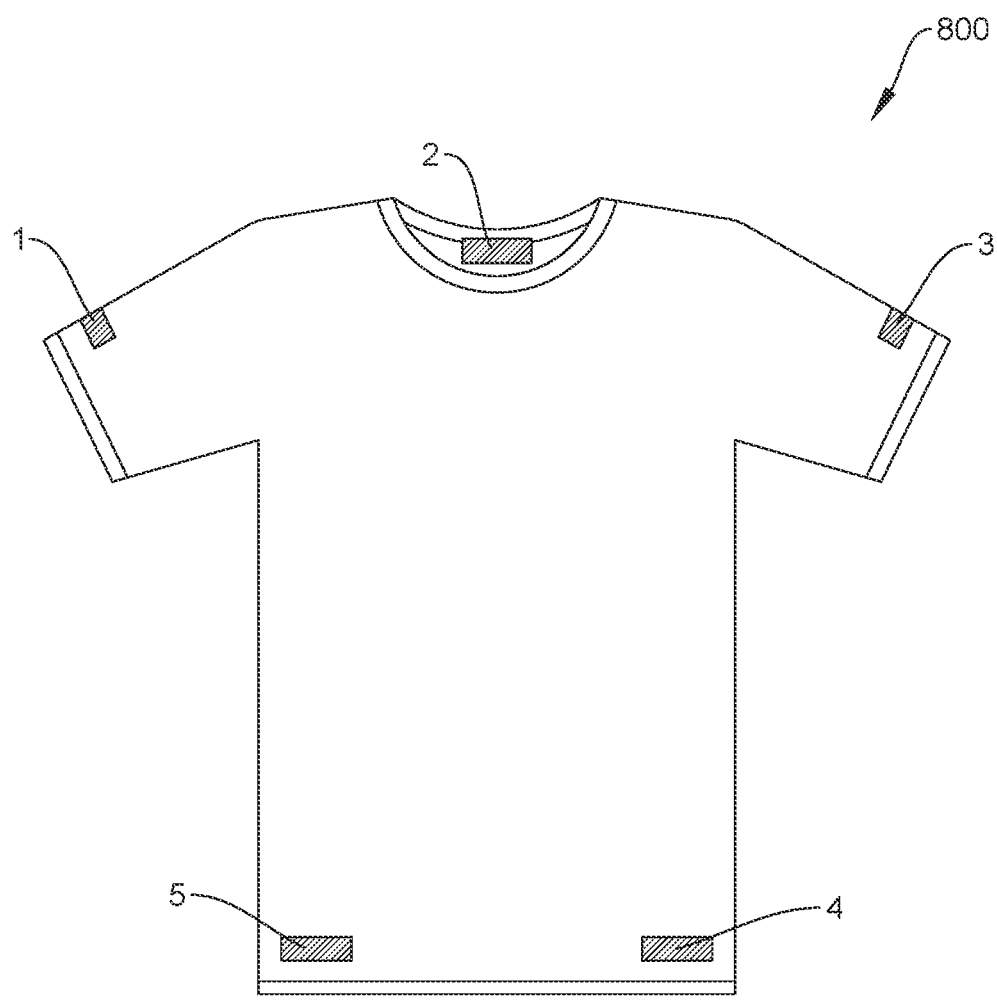
FIG. 8 and FIG. 9 illustrates an exemplary garment and different positions where the washable fabric that is coupled with the NFC tag may be sewed to the garment, in accordance with an embodiment of the present invention.

FIG. 7 illustrates a use case scenario 700 wherein a user scans the washable fabric that is coupled with the NFC tag using a NFC reader so that the information within the NFC tag can be displayed to the user, in accordance with an embodiment of the present invention. In an exemplary implementation, consider a User B having a garment on which a washable fabric coupled with a NFC tag is available. Further, a User A may perform an operation, such as tapping or may bring an NFC reader, such as a mobile device near the washable fabric coupled with the NFC tag to read the information in the NFC tag. Once the User A scans the NFC tag on the garment of the User B then all the information on the NFC tag is transmitted to the mobile device of User A and is displayed in the screen of the mobile device. For example, the User A may be able to view a plurality of links that are linked with a plurality of items that the User B wants to resell or purchase a similar product directly from the manufacturer of the item. In an embodiment, manufacturer of the items may get a percentage of profit during resale of the items from User B to User A.

Figure 9:
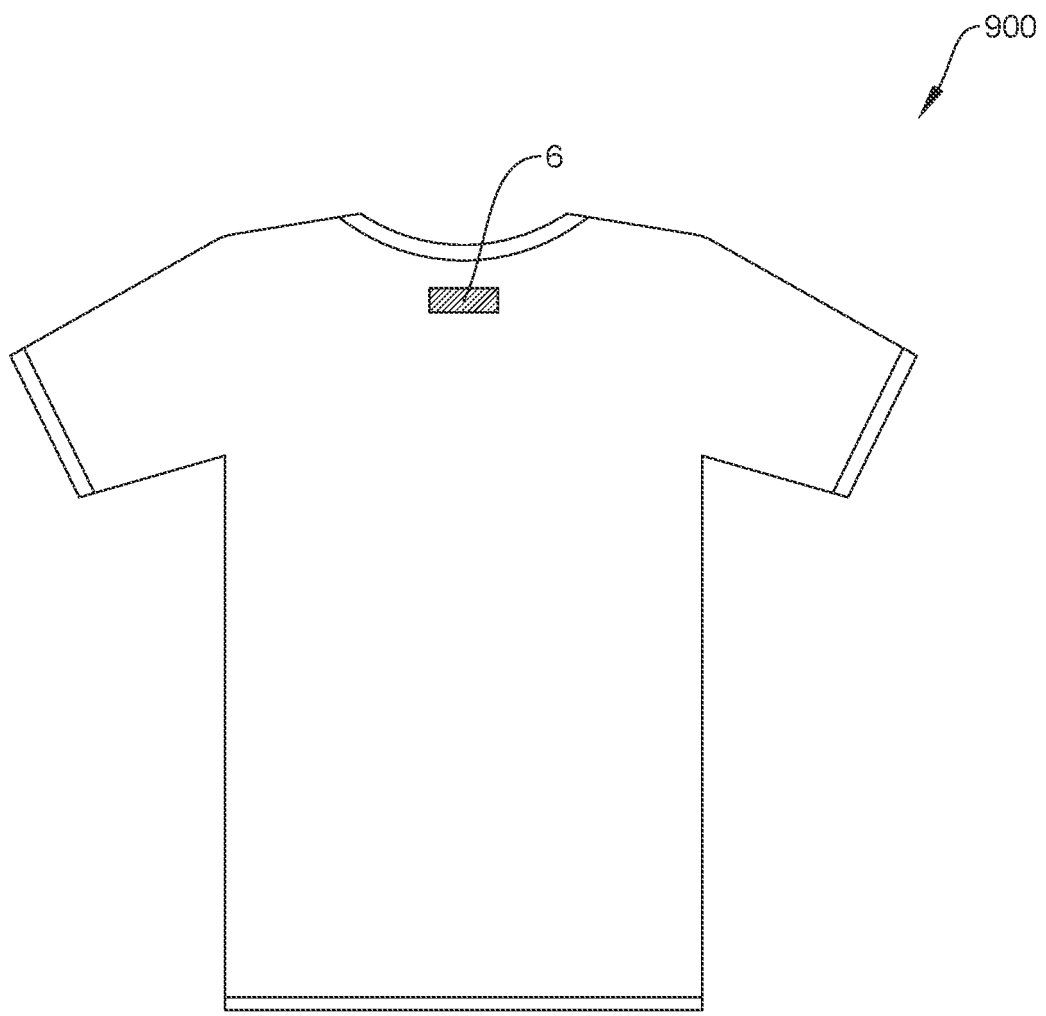
Figure 9:
Figure 9:

FIG. 8 800 and FIG. 9 900 illustrates an exemplary garment and different positions where the washable fabric that is coupled with the NFC tag may be sewed to the garment, in accordance with an embodiment of the present invention. For example, the NFC tag may be sewed to the washable fabric on the right sleeve (1), inside the neck (2), left sleeve (3), left hem (4), right hem (5), and outside the neck (6) on the backside of the garment as illustrated in FIG. 9 900. In an embodiment, the FIG. 9 also provide an exemplary stitching detail of the neck label where the neck label is stitched only at the top longitudinal end. Further, in another embodiment, the exterior label is stitched around in all the four edges of the rectangular shape.

FIGS. 10A-10G illustrate a first perspective view 1000, a front view 1002, a rear view 1004, a left side view 1006, a right side view 1008, a top view 1010, and a second perspective view 1012 respectively, in accordance with an embodiment of the present invention.

Figure 10A:
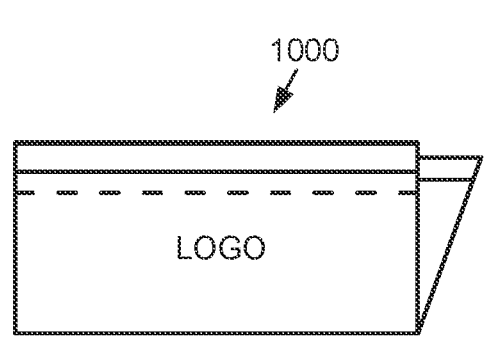
FIGS. 10A-10G illustrate a first perspective view, a front view, a rear view, a left side view, a right side view, a top view, and a second perspective view respectively, in accordance with an embodiment of the present invention.
Figure 10B:
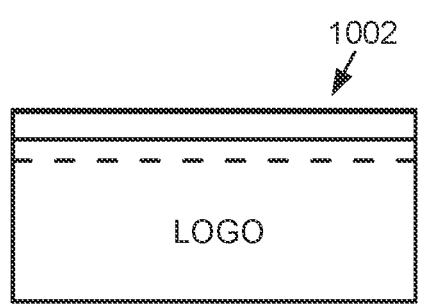
Figure 10C:
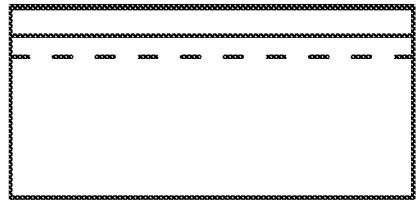
Figure 10D:
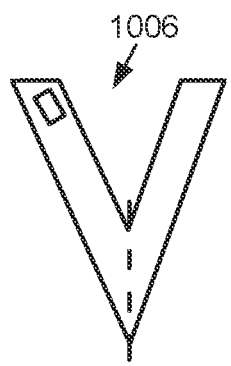
Figure 10E:
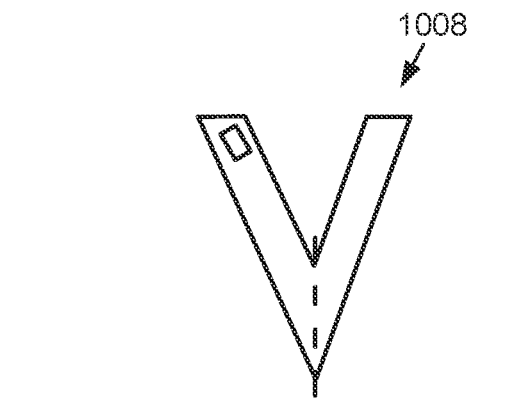
Figure 10F:
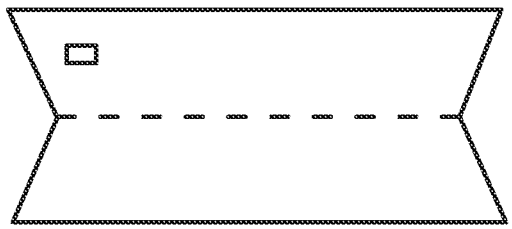
Figure 10G:
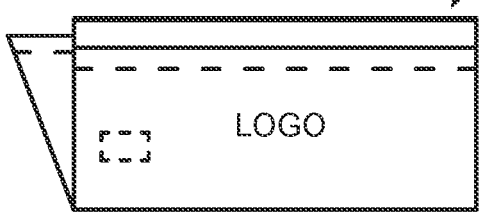

The first perspective view 1000 (as shown in FIG. 10A) shows that the logo printed on the washable fabric that is facing the users and also shows a partial view of the inner portion of back side of the washable fabric. The front view 1002 (as shown in FIG. 10B) shows how the logo printed on the washable fabric that is facing the users. The rear view 1004 (as shown in FIG. 10C) shows the stitching and the folding done to the washable fabric in order to sew the washable fabric coupled with the NFC tag to the garment. The left side view 1006 (as shown in FIG. 10D) of the washable fabric shows the first inner section and the second inner section of the washable fabric. As shown in the FIG. 10D, the NFC tag is sewed on the inner side of the first section. The right side view 1008 (as shown in FIG. 10E) of the washable fabric shows the first inner section and the second inner section of the washable fabric. As shown in the FIG. 10E, the NFC tag is sewed on the inner side of the first section. The top view 1010 (as shown in FIG. 10F) of the washable fabric shows the first inner section and the second inner section of the washable fabric. Further, as shown in the FIG. 10F, the NFC tag is sewed on the inner side of the first section. The second perspective view 1012 (as shown in FIG. 10G) shows the that the logo printed on the washable fabric that is facing the users and also shows a partial view of the inner portion of back side of the washable fabric. In an embodiment, the NFC tag is sewed on an inner side of the washable fabric.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system for prominently propagating advertisements and messages from a garment and providing the garment for sale, the system comprising:
a washable fabric section defining an outer side and an inner side, the washable fabric section being attachable to the garment, whereby the inner side faces the garment, the washable fabric section further defining a fold line along the longitudinal, whereby the fold line separates the washable fabric section into a first portion and a second portion, whereby the washable fabric section attaches to a prominently visible area of the garment and the washable fabric is further sewed to the garment;
a processor;
a NFC tag coupled with the processor to control the functioning of the NFC tag, the NFC tag integrated into the first portion of the washable fabric, the NFC tag comprising an antenna, an integrated circuit chip, and a memory for storing data, the integrated circuit chip enabling wireless communication with an NFC reader, whereby the NFC tag wirelessly transmits information through NFC technology to the NFC reader,
the NFC reader operable to energize the NFC tag to transfer the information, the NFC reader further operable to display the information, wherein the information comprises at least one of an online link to an advertisement, a message, a link for buying a product, or a link for joining a social media network;
a logo label integrated into the second portion of the washable fabric, the logo label comprising indicia, a graphic mark, an emblem, a symbol, or a stylized name used to identify a company, an organization, a product, or a brand;
the memory communicatively coupled to the processor, wherein the memory stores processor instructions, which, on execution, causes the processor to:
scan the NFC tag using the NFC reader;
receive a user profile information on the NFC reader based on the scanning;
displaying on the NFC reader one or more items available for at least one of sale or resale from at least one of the user or a manufacturer to another user who has scanned the NFC tag; and
perform one or more actions on the one or more items available for at least one of sale or resale, wherein the one or more actions comprise buying the one or more items, or reselling the one or more items, wherein if the one or more items are resold to another user then a pre-defined amount of a transaction value is transmitted to an original manufacturer of the one or more items.

2. The system of claim 1, wherein the NFC reader comprises a smart phone.

3. The system of claim 1, wherein the NFC tag is waterproof.

4. The system of claim 1, wherein the washable fabric section defines a flat, rectangular shape.

5. The system of claim 1, wherein the data stored in the memory further comprises a social media site for the company, the organization, the product, or the brand.

6. The system of claim 1, wherein the data stored in the memory further comprises a website for the company, the organization, the product, or the brand.

7. The system of claim 1, wherein the garment is a shirt.

8. The system of claim 1, wherein the one or more actions further comprise sharing the one or more items available for sale or resale on a social media network.

9. The system of claim 1, wherein the NFC tag further comprises information comprises at least one of an online link to an advertisement, a message, a link for buying a product, or a link for joining a social media network.

10. The system of claim 1, wherein the NFC reader comprises a mobile device.

11. The system of claim 1, wherein displaying the one or more items comprising displaying the one or more items to the user for buying; and after a confirmed buying by the user, shipping the one or more items to an address of the user.

* * * * *